(12) United States Patent
Endo

(10) Patent No.: US 10,582,151 B2
(45) Date of Patent: *Mar. 3, 2020

(54) CAMERA SYSTEM, VIDEO PROCESSING APPARATUS, AND CAMERA APPARATUS

(71) Applicant: Sony Corporation, Tokyo (JP)

(72) Inventor: Kazuo Endo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,276

(22) Filed: Aug. 29, 2019

(65) Prior Publication Data
US 2019/0387196 A1 Dec. 19, 2019

Related U.S. Application Data

(63) Continuation of application No. 16/266,154, filed on Feb. 4, 2019, which is a continuation of application (Continued)

(30) Foreign Application Priority Data

Mar. 31, 2010 (JP) .................................. 2010-080360

(51) Int. Cl.
H04N 7/01 (2006.01)
H04N 7/22 (2006.01)
(Continued)

(52) U.S. Cl.
CPC ............ *H04N 7/0117* (2013.01); *H04N 5/04* (2013.01); *H04N 5/217* (2013.01); *H04N 5/225* (2013.01);
(Continued)

(58) Field of Classification Search
CPC ............ H04N 7/0117; H04N 5/23203; H04N 7/0135; H04N 7/183; H04N 9/79;
(Continued)

(56) References Cited

U.S. PATENT DOCUMENTS 6,005,618 A 12/1999 Fukui et al.
7,154,550 B1 12/2006 Kaku
(Continued)

FOREIGN PATENT DOCUMENTS

CN 1135275 11/1996
JP 10-155104 6/1998
(Continued)

OTHER PUBLICATIONS

Office Action issued in corresponding Chinese application No. 2011100755811 dated Nov. 3, 2014.

*Primary Examiner* — Nhan T Tran
(74) *Attorney, Agent, or Firm* — Haug Partners LLP; William S. Frommer

(57) ABSTRACT

Disclosed herein is a camera system including, a camera apparatus having, an image sensor, a correction section, a first transmission processing section, and a synchronization processing section, and a video processing apparatus having a second transmission processing section and a conversion section, wherein the video processing apparatus outputs the video data obtained by the conversion by the conversion section.

29 Claims, 5 Drawing Sheets

Related U.S. Application Data

No. 15/497,346, filed on Apr. 26, 2017, now Pat. No. 10,237,514, which is a continuation of application No. 14/859,479, filed on Sep. 21, 2015, now Pat. No. 9,686,503, which is a continuation of application No. 14/291,438, filed on May 30, 2014, now Pat. No. 9,172,852, which is a continuation of application No. 13/930,168, filed on Jun. 28, 2013, now Pat. No. 8,934,022, which is a continuation of application No. 13/071,718, filed on Mar. 25, 2011, now Pat. No. 8,711,253.

(51) Int. Cl.

| | | |
|---|---|---|
| *H04N 5/376* | (2011.01) | |
| *H04N 5/232* | (2006.01) | |
| *H04N 5/217* | (2011.01) | |
| *H04N 5/77* | (2006.01) | |
| *H04N 7/18* | (2006.01) | |
| *H04N 5/04* | (2006.01) | |
| *H04N 5/38* | (2006.01) | |
| *H04N 5/91* | (2006.01) | |
| *H04N 5/225* | (2006.01) | |
| *H04N 13/239* | (2018.01) | |
| *H04N 13/30* | (2018.01) | |
| *H04N 9/04* | (2006.01) | |
| *H04N 13/296* | (2018.01) | |
| *H04N 13/189* | (2018.01) | |
| *H04N 13/139* | (2018.01) | |
| *H04N 9/79* | (2006.01) | |
| *H04N 9/45* | (2006.01) | |

(52) U.S. Cl.
CPC ..... *H04N 5/23203* (2013.01); *H04N 5/23232* (2013.01); *H04N 5/23293* (2013.01); *H04N 5/3765* (2013.01); *H04N 5/38* (2013.01); *H04N 5/77* (2013.01); *H04N 5/91* (2013.01); *H04N 7/0135* (2013.01); *H04N 7/183* (2013.01); *H04N 7/22* (2013.01); *H04N 9/045* (2013.01); *H04N 9/79* (2013.01); *H04N 13/139* (2018.05); *H04N 13/189* (2018.05); *H04N 13/239* (2018.05); *H04N 13/296* (2018.05); *H04N 13/30* (2018.05); *H04N 9/45* (2013.01); *H04N 2209/045* (2013.01)

(58) Field of Classification Search
CPC ........ H04N 5/217; H04N 5/38; H04N 13/189; H04N 5/77; H04N 5/225; H04N 13/239; H04N 5/23232; H04N 5/04; H04N 5/3765; H04N 9/045; H04N 13/296; H04N 13/139; H04N 13/30
See application file for complete search history.

(56) References Cited

U.S. PATENT DOCUMENTS

| | | | |
|---|---|---|---|
| 8,711,253 | B2 | 4/2014 | Endo |
| 9,686,503 | B2 | 6/2017 | Endo |
| 2008/0246859 | A1 | 10/2008 | Mizutani et al. |
| 2010/0013963 | A1* | 1/2010 | Jannard ............... H04N 5/3675 348/242 |
| 2010/0111489 | A1* | 5/2010 | Presler ................ H04N 5/225 386/278 |
| 2010/0309351 | A1* | 12/2010 | Smith .................. H04N 5/335 348/280 |
| 2011/0200106 | A1* | 8/2011 | Park ............... H04N 21/234327 375/240.15 |
| 2013/0230102 | A1* | 9/2013 | Lasserre ............. H04N 19/149 375/240.12 |

FOREIGN PATENT DOCUMENTS

| | | |
|---|---|---|
| JP | 2000-261830 | 9/2000 |
| JP | 2006 13830 | 1/2006 |
| JP | 2006-181021 | 7/2006 |
| JP | 2008-048269 | 2/2008 |

* cited by examiner

FIG.2A

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG.2B

| R | G | B | R | G | B |
|---|---|---|---|---|---|
| R | G | B | R | G | B |
| R | G | B | R | G | B |
| R | G | B | R | G | B |
| R | G | B | R | G | B |
| R | G | B | R | G | B |

CAMERA SYSTEM, VIDEO PROCESSING APPARATUS, AND CAMERA APPARATUS

This is a continuation of application Ser. No. 16/266,154, filed Feb. 4, 2019, which is a continuation of application Ser. No. 15/497,346, filed Apr. 26, 2017, now U.S. Pat. No. 10,237,514, issued on Mar. 19, 2019; which is a continuation of application Ser. No. 14/859,479, filed Sep. 21, 2015, now U.S. Pat. No. 9,686,503, issued on Jun. 20, 2017, which is a continuation of application Ser. No. 14/291,438, filed May 30, 2014, now U.S. Pat. No. 9,172,852, issued on Oct. 27, 2015, which is a continuation of application Ser. No. 13/930,168, filed Jun. 28, 2013, now U.S. Pat. No. 8,934,022, issued on Jan. 13, 2015, which is a continuation of application Ser. No. 13/071,718, filed Mar. 25, 2011, now U.S. Pat. No. 8,711,253, issued on Apr. 29, 2014, which is entitled to the priority filing date of Japanese application 2010-080360, filed Mar. 31, 2010, the entirety of which is incorporated herein by reference.

BACKGROUND OF THE INVENTION

1. Field of the Invention

The present invention relates to a camera system capable of imaging at high resolutions and a video processing apparatus and a camera apparatus that are applicable to this camera system. More particularly, the present invention relates to technologies that are applied when the camera apparatus can output a signal obtained by imaging in a pixel array without change.

2. Description of the Related Art

For camera apparatuses (or video cameras) that obtain a video signal (or an image signal) by imaging, a variety of camera apparatuses have been developed with the number of frame pixels largely exceeding the number of pixels specified by normal broadcasting standards and the like. For example, camera apparatuses have been developed that can obtain a video signal so-called 4K×2K signal, the number of horizontal pixels being about 4,000, largely exceeding the number of pixels of an HD (High Definition) signal with the number of horizontal pixels 1920×the number of vertical pixels 1080. To be more specific, cameras capable of handling the number of horizontal pixels 4096×the number of vertical pixels 2160 per frame and the number of horizontal pixels 3840×the number of vertical pixels 2160 per frame. In addition, camera apparatuses have been proposed that are configured to handle a so-called 8K×4K signal having the number of horizontal pixels being about 8000 and the number of vertical pixels being about 4000.

These video signals of high resolutions in excess of the number of pixels of the HD signal increase the quantity of data in proportion to the increased number of pixels per frame, thereby requiring the transmission of accordingly high transfer rates. These high-resolution video signals also require the recording processing in a recording system and the monitor display processing in a display system to cope with these high resolutions.

Japanese Patent Laid-open No. 2006-13830 shown below discloses a system configured to transmit a video signal constructed as a 4K×2K signal from a camera apparatus for example.

SUMMARY OF THE INVENTION

It should be noted that, in the case of a video signal having a resolution as high as that of the 4K×2K signal, the number of pixels per frame is extremely large, therefore extremely increasing the load of the processing for generating such a video signal. For example, an image sensor incorporated in a camera apparatus for converting an image light into an imaging signal often has a pixel array unique to that camera apparatus in order to attain efficient imaging. Namely, in the case of an image sensor with the primary colors R (Red), G (Green), and B (Blue) arranged, some image sensors have special configurations in which the three primary colors R, G, and B are not equally arranged. One of these special arrangements is known as the Bayer array for example.

In the case of such a pixel array as the Bayer array, generating a signal of each pixel in a video signal requires the processing of interpolating the output of adjacent pixels in the image sensor. To be more specific, it is necessary to execute the conversion from the actual pixel array on the image sensor into a pixel array of an output video signal.

However, executing video signal processing such as pixel conversion processing inside a camera apparatus accordingly increases the load of the camera apparatus, thereby resulting in the increase in the size and power consumption of the camera apparatus. Especially, a circuit for realtime processing a video signal of high resolutions such as a 4K×2K signal requires a very large circuit scale and a very high-speed operation, leading unpreferably to the deteriorated mobility and maneuverability of the camera apparatus.

In the case of related-art systems configured to obtain a video signal of high resolutions such as a 4K×2K signal for example, an imaging signal obtained from the image sensor in the camera apparatus is once stored in a recording section in the camera apparatus as file in the form of a signal having the pixel array without change (namely, a raw signal) and then the stored data file is read to be converted by a another apparatus. For the conversion of stored data files, a video conversion system based on a computer apparatus for example is applicable.

Converting, after storing this raw signal as a file, the stored data into a standard video signal makes it unnecessary for a raw signal to be converted into a video signal in a realtime manner, thereby decreasing the load of processing.

However, the processing configuration in which the conversion is executed after file storage does not allow the user to see the video taken realtime, thereby presenting a problem that this configuration cannot provide a live operation of the system.

In addition, if a multi-camera system is configured by two or more camera apparatuses as with a camera system for executing 3D imaging to obtain a video for three-dimensional representation, the above-mentioned filing of raw signals presents a problem of requiring the processing of giving a synchronization of raw signals between the two or more camera apparatuses.

Therefore, the present invention addresses the above-identified and other problems associated with related-art methods and apparatuses and solves the addressed problems by providing a camera system, a video processing apparatus, and camera apparatus that are configured to realtime and excellently process high-resolution signals taken by the camera apparatus.

In carrying out the invention and according to one embodiment thereof, there is provided a camera system. This camera system is configured by a camera apparatus and a video processing apparatus.

The camera apparatus has an image sensor, a correction section, a first transmission processing section, and a synchronization processing section.

The image sensor is configured to include pixels arranged in a predetermined array and output an imaging signal having a pixel sequence corresponding to the array of the pixels.

The correction section is configured to correct the imaging signal outputted from the image sensor to video data having the pixel sequence.

The first transmission processing section is configured to add synchronous data to the video data outputted from the correction section to output resultant data to outside.

The synchronization processing section is configured to control a timing of imaging by the image sensor on the basis of synchronous timing setting data received by the first transmission processing section.

The video processing apparatus has a second transmission processing section and a conversion section.

The second transmission processing section is configured to receive the video data outputted from the first transmission processing section and output synchronous timing setting data to be transmitted to the first transmission processing section.

The conversion section is configured to execute pixel interpolation of the video data received by the second transmission processing section to convert the interpolated video data into video data having a pixel array specified by a video format.

The video processing apparatus outputs the video data obtained by the conversion by the conversion section.

As described and according to the embodiments of the present invention, the camera apparatus may only output an imaging signal outputted from the image sensor as the video data having a pixel array without change. Therefore, there is no need for execution interpolation processing for example for providing the video data having a specified format in the camera apparatus.

In addition, the timing of imaging by the camera apparatus is synchronized with synchronization timing setting data transmitted from the video processing apparatus, so that the timing of imaging in the camera apparatus can be controlled by the video processing apparatus.

According to the embodiments of the present invention, the camera apparatus need not interpolate an imaging signal outputted from image sensor to the video data having a specified format, thereby realizing the imaging of high-resolution video without hampering the mobility of the camera apparatus.

In addition, video data outputted from the camera apparatus can be converted in to the video data having a specified format by executing interpolation processing corresponding to the pixel array of the image sensor by the video processing apparatus connected to the camera apparatus, thereby realtime displaying the video obtained by the imaging by the camera apparatus is to be realized.

Consequently, the embodiments of the present invention can image and display high-resolution video keeping the nature of realtime.

BRIEF DESCRIPTION OF THE DRAWINGS

FIGS. 2A and 2B are diagrams illustrating exemplary pixel arrays of an image sensor practiced as the above-mentioned embodiment of the invention;

DETAILED DESCRIPTION OF THE PREFERRED EMBODIMENTS

Figure 1:
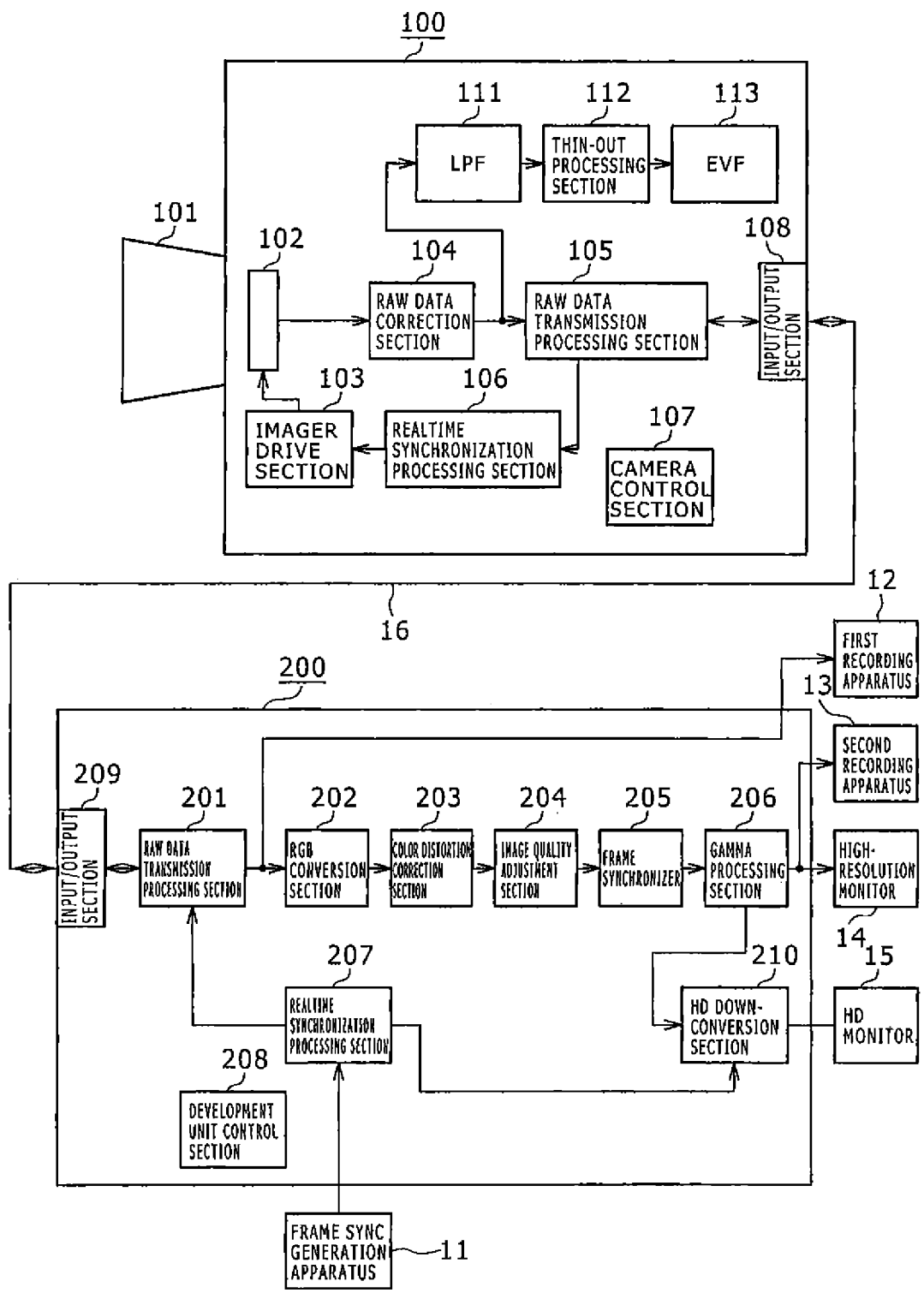
FIG. 1 is a block diagram illustrating an exemplary system configuration practiced as one embodiment of the invention.
Figure 5:
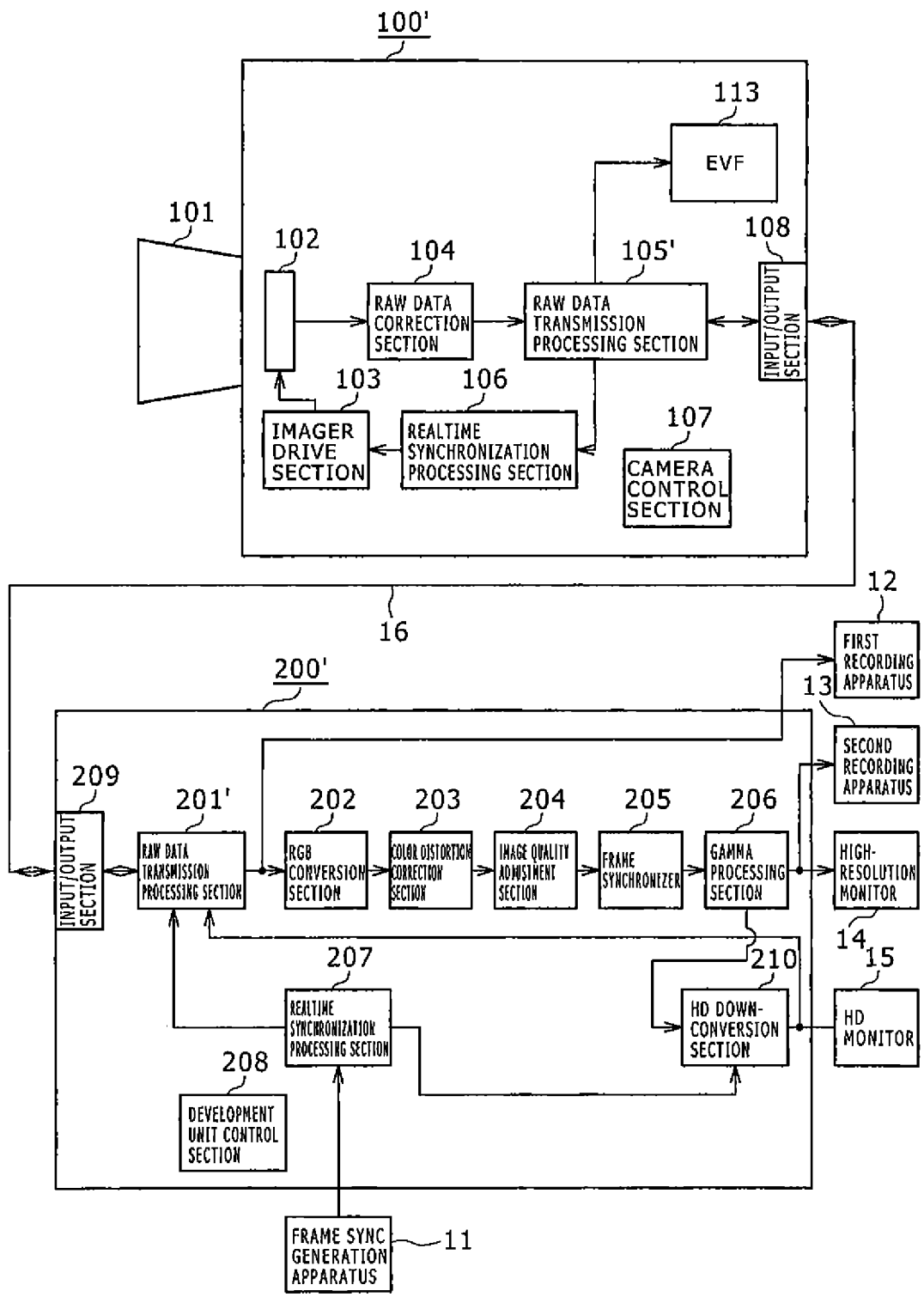
FIG. 5 is a block diagram illustrating an exemplary system configuration practiced as another embodiment of the invention.

This invention will be described in further detail by way of embodiments thereof with reference to the accompanying drawings. The description will be made in the following order:

(1) the description of an overall system of one embodiment (FIG. 1);

(2) the description of an exemplary pixel array of an image sensor and raw data (FIG. 2A through FIG. 4B);

(3) the description of another embodiment (FIG. 5);

(4) the description of an example in which the embodiments are applied to a 3D imaging system (FIG. 6); and (5) the description of variations.

(1) The Description of an Overall System of One Embodiment

Now, referring to FIG. 1, there is shown an exemplary system configuration practiced as one embodiment of the invention.

In this embodiment, a camera system is configured by a camera apparatus 100, a development unit 200 that functions as a video processing apparatus for processing video data obtained in the camera apparatus 100, and peripheral devices thereof. The camera apparatus 100 and the development unit 200 are interconnected by an optical cable 16. Between input/output sections of the camera apparatus 100 and the development unit 200 interconnected by the optical cable 16, data can be transmitted at high rates of around 2 G bits/second for example, which is capable of transmitting data imaged by the camera apparatus 100 without change.

The camera apparatus 100 has a camera control section 107 that controls the imaging operations by the component sections of the camera apparatus 100.

In imaging by the camera apparatus 100, an image light obtained through a lens 101 is formed on the imaging surface of an image sensor 102 and the formed image is photoelectrically converted, pixel by pixel, into an image signal. For the image sensor 102, a CCD (Charge Coupled Device) image sensor, a CMOS (Complementary Metal Oxide Semiconductor) image sensor, or the like is available. The image sensor 102 is a high-resolution image sensor that provides a 4K×2K signal with the number of pixels per frame being 4096 horizontal and 2160 vertical. The pixel arrangement of the image sensor 102 will be described later. It should be noted here that, if the number of pixels per frame is 4096 horizontal and 2160 vertical, this number of pixels is that of video data having a format with this number of pixels finally specified, so that the number of pixels on the image sensor 102 may not match the values of these 4096 horizontal and 2160 vertical.

An imaging operation by the image sensor 102 is executed in synchronization with a drive signal supplied from an imager drive section 103, in which an imaging signal is read on one horizontal line basis in synchronization with this drive signal.

The imaging signal outputted from the image sensor 102 is supplied to a raw data correction section 104. The raw data herein denotes video data in which an imaging signal outputted from the image sensor 102 in a sequence corresponding to the pixel array of the image sensor 102 retains this pixel sequence. Therefore, raw data is different from transmission formats of normal video data in pixel sequence and the number of pixel.

The raw data correction section 104 executes the processing on a signal of each pixel of an imaging signal supplied from the image sensor 102 for correcting pixel scratch, vertical stripes, noise, and the like, if any, unique to the image sensor 102, thereby providing raw data. Basically, the number of pixels of an imaging signal and those of the raw data are equal to each other, so that the raw data correction section 104 does not execute the processing of converting the number of pixels and pixel positions. However, it is also practicable to provide a configuration in which invalid areas around an imaging signal of one frame are removed to decrease the number of pixels.

The raw data corrected by the raw data correction section 104 is supplied to a raw data transmission processing section 105 to be processed for the transmission to the development unit 200. Here, synchronous data is added to the raw data of one frame and the data attached with the synchronous data is outputted from an input/output section 108 to the optical cable 16. In this case, the raw data transmission processing section 105 may convert the number of bits for example for the raw data of one pixel. For example, if the data of one pixel supplied from the raw data correction section 104 is configured by 12 bits, then the data of one pixel may be converted into 16 bits. Alternatively, the data of one pixel may be converted in nonlinear data.

The data (the synchronous data) entered in the input/output section 108 from the optical cable 16 is supplied to the raw data transmission processing section 105 and the synchronous data obtained by the raw data transmission processing section 105 is supplied to a realtime synchronization processing section 106. The received synchronous data provides the synchronous timing setting data for setting the imaging timing with this camera apparatus 100.

The input/output section 108 has a terminal for connecting the optical cable 16 and executes the processing of transmitting data over the optical cable 16 connected to this terminal and the processing of receiving data supplied over the optical cable 16.

On the basis of the supplied synchronous data, the realtime synchronization processing section 106 controls the drive timing in the imager drive section 103, thereby setting the image sensor 102 so as to execute imaging processing with the timing indicated by the synchronous data. It should be noted that the synchronous data supplied from the development unit 200 includes at least a vertical synchronous component for defining a frame period.

The raw data corrected by the raw data correction section 104 is passed through a lowpass filter 111 to remove the high-frequency component and the resultant raw data is supplied to a thin-out processing section 112 to thin out pixels, thereby providing video data having a comparatively low resolution. The video data obtained in the thin-out processing section 112 is supplied to an electronic viewfinder (EVF) 113 to be displayed.

The following describes an exemplary configuration of the development unit 200 that is a video processing apparatus for processing the raw data supplied from the camera apparatus 100.

The development unit 200 has a development control unit 208 that controls each component units of the development unit 200. It should be noted that the development control unit 208 is configured to communicate with a camera control section 107 to execute processing in synchronization therewith.

The development unit 200 has an input/output section 209 to which the optical cable 16 is connected. A raw data transmission processing section 201 connected to the input/output section 209 executes the processing of receiving the raw data supplied from the camera apparatus 100. The raw data received and processed by the raw data transmission processing section 201 is supplied to a RGB conversion section 202 to be converted into video data having a pixel array of a format specified by standard as video data. To be more specific, the raw data is video data that depends on the pixel array of the image sensor 102 of the camera apparatus 100 and this video data is converted into video data having a sequence with the pixel array of three primary colors R, G, and G specified. This conversion processing is executed by the interpolation with the data of pixels at adjacent positions. If pixels lacking in the three primary color pixels are supplemented, there occurs a difference in the number of pixels before and after the conversion.

It should be noted that the raw data obtained by the raw data transmission processing section 201 is outputted from the development unit 200 without change to be supplied to a first recording apparatus 12 to be recorded therein.

The video data obtained by the RGB conversion section 202 is supplied to a color distortion correction section 203. The color distortion correction section 203 executes the color correction on a pixel basis so as to bring the color reproduction characteristics unique to the image sensor 102 in the camera apparatus 100 near to the actual color reproduction.

The video data corrected by the color distortion correction section 203 is supplied to a picture quality adjustment section 204. The color distortion correction section 203 executes such picture quality adjustment by user setting as white level, black level, and gamma correction. The picture quality adjustment section 204 can change the picture quality adjusted states by externally changing corresponding parameters.

The video data adjusted by the color distortion correction section 203 is supplied to a frame synchronizer 204 to be once stored in a frame memory of the frame synchronizer 205. The stored video data is read with a specified timing to adjust the output timing of the video data.

The video data outputted from the frame synchronizer 205 is supplied to a gamma correction processing section 206, in which the correction processing based on the gamma characteristics of the display apparatus is executed on the video data. The corrected video data is then outputted. In this example, the outputted video data is supplied to a high-resolution monitor 14 to be displayed thereon. At the same time, the outputted video data is supplied to a second recording apparatus 13 to be recorded therein. The high-resolution monitor 14 is a monitor display having a capacity of displaying a 4K×2K signal for example.

Also, the video data corrected by the gamma correction processing section 206 is supplied to a down-conversion section 210 to be converted into video data of the HD standard. The video of the HD standard has the number of pixels per frame of horizontal 1920×vertical 1080, for example. The conversion processing by the down-conversion section 210 is executed with a timing synchronized with the synchronous data supplied from a realtime synchronization processing section 207. The video data converted by the down-conversion section 210 is outputted to the outside. In this example, the outputted video data is supplied to a HD monitor 15 to be displayed thereon. The HD monitor 15 is a monitor display having a capacity of displaying video data of the HD standard.

In addition, the development unit 200 has the realtime synchronization processing section 207, in which synchronization on a frame basis is provided when video processing is executed in each component section in the development unit 200, thereby providing control so as to prevent jitters from occurring.

To be more specific, synchronous data synchronized with synchronous timing data supplied from an external frame synchronization generation apparatus 11 is generated by the realtime synchronization processing section 207. The synchronous data generated by the realtime synchronization processing section 207 is outputted to the optical cable 16 via the raw data transmission processing section 201 and the input/output section 209, the synchronous data being transmitted to the camera apparatus 100.

In addition, the video data down-converted by the down-conversion section 210 is outputted with a timing synchronized with the synchronous data supplied from the frame synchronization generation apparatus 11. Also, the video data outputted from the gamma correction processing section 206 to the outside is the video data of the timing synchronized with the same synchronous timing data.

(2) The Description of an Exemplary Pixel Array of an Image Sensor and Raw Data

The following describes the imaging processing to be executed in the system configuration shown in FIG. 1 with reference to FIG. 2A through FIG. 4B.

FIG. 2A shows an exemplary pixel array of the image sensor 102 of the camera apparatus 100. In this example, the pixels of the three primary colors are arranged in a Bayer array. To be more specific, on a certain horizontal line, red pixels R and green pixels G are alternately arranged on one pixel basis. On the following horizontal line, green pixels G and blue pixels B are alternately arranged on one pixel basis. A pair of these two horizontal lines are repeated. However, green pixel G on a horizontal line with red pixel R arranged and green pixel G on a horizontal line with blue pixel B arranged are shifted in vertical position from each other.

The Bayer array such as this results in efficient imaging.

A pixel array of an image sensor shown in FIG. 2B an example in which the pixels of three primary colors are simply arranged for the purpose of reference, which is different from that of the image sensor 102 of the camera apparatus 100. To be more specific, red pixel R, green pixel G, and blue pixel B are alternately arranged on each horizontal line. In the case of the array shown in FIG. 2B, the three primary color pixels are alternately obtained, so that the video data for output can be provided with this pixel array without change.

In the present embodiment, the raw data generated in the camera apparatus 100 is the video data having the pixel array shown in FIG. 2A without change.

Figure 3:
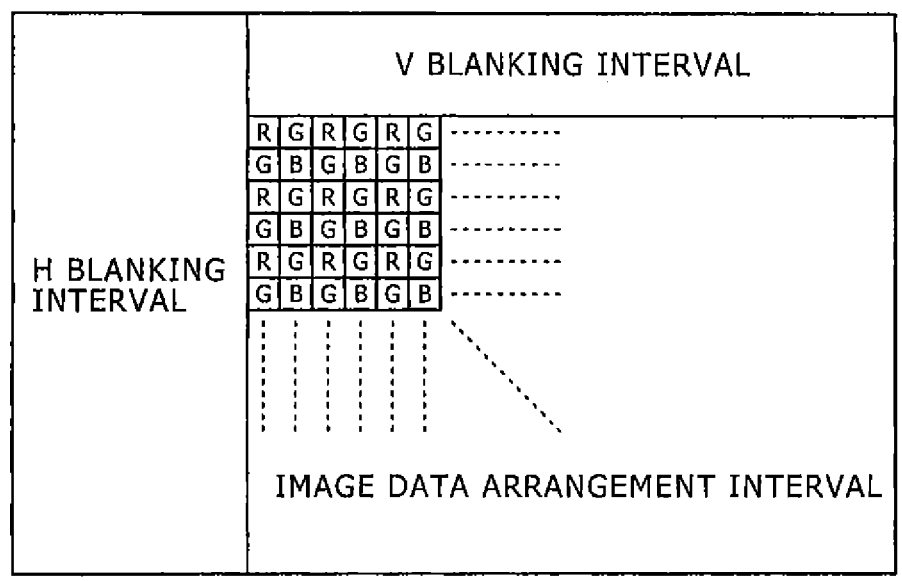
FIG. 3 is a diagram illustrating an exemplary configuration of raw video data practiced as the above-mentioned embodiment of the invention.

To be more specific, FIG. 3 shows an exemplary configuration of raw data. This raw data has a vertical blanking interval (a V blanking interval), a horizontal blanking interval (a H blanking interval), and a video data interval. In the video data interval, the data is arranged on a pixel basis with the pixel array shown in FIG. 2A retained. The data of each pixel is indicated by 12 bits or 14 bits, for example, in the level of one pixel.

The data in each blanking interval may be configured in the same manner as the data of the blanking interval of normal video data.

Figure 4A:
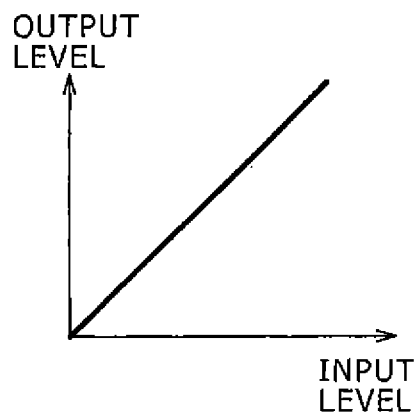
FIGS. 4A and 4B are diagram illustrating exemplary raw video data compression processing practiced as the above-mentioned embodiment of the invention.
Figure 4B:
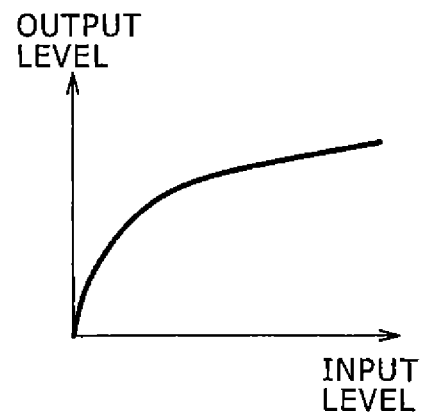

It is also practicable to execute level compression processing through the raw data transmission processing section 105 of the camera apparatus 100. To be more specific, as shown in FIG. 4A, originally, the data of each pixel of raw data is set such as there is a linear correlation between the input level and the output level for each pixel. By contrast, as shown in FIG. 4B, the bit length may be compressed such that there is a nonlinear correlation between the input level and the output level.

If it is practicable to transmit raw data to the development unit 200 without executing this bit length compression, it is preferable to do so. This enhances the computation accuracy in the development unit 200, thereby displaying the video of higher resolutions and higher color reproducibility on the monitors 14 and 15 and recording this video data on the first recording apparatus 12 and the second recording apparatus 13.

As described above, according to the system configuration of the present embodiment, the camera apparatus 100 can output the video data obtained by the image sensor 102 with the pixel array unchanged, thereby eliminating the necessity of the conversion processing such as pixel interpolation in the camera apparatus 100. Therefore, the configuration of the camera apparatus for imaging the video of high resolutions can be configured relatively simply. At the same time this configuration reduces the size and weight of the camera apparatus, thereby ensuring the mobility of the camera apparatus. In addition, this configuration contributes to the saving of the power dissipation of the camera apparatus used for the imaging of high-resolution video.

The video data outputted from the camera apparatus 100 is converted into the video data having a format specified by the development unit 200, the video of high resolutions can be displayed realtime with the imaging on the high-resolution monitor 14 connected to the development unit 200. The recording of this video can also be executed realtime on the recording apparatus connected to the development unit 200.

Further, in the system configuration of the present embodiment, the processing of enhancing the picture quality of video data is executed by the development unit 200, so that various types of picture quality enhancement processing can be executed without changing the configuration of the camera apparatus. Therefore, the processing based on comparatively sophisticated algorithms that is therefore difficult to be incorporated in the camera apparatus can be realized with ease and the modification of these algorithms can be executed comparatively easily.

It should be noted that, in the configuration shown in FIG. 1, the two recorders, the first recording apparatus 12 and the second recording apparatus 13, are arranged; however, it is also practicable to arrange only one of these recording apparatuses. The first recording apparatus 12 records raw data without change, so that recording can be made with a relatively small quantity of data. The second recording apparatus 13 records raw data that have been converted, so that the recorded video data can be outputted without change for display for example.

(3) The Description of Another Embodiment

The following describes another embodiment of the present invention with reference to FIG. 5.

With reference to FIG. 5, similar components previously described with reference to FIG. 1 are denoted by the same reference numerals.

In the example shown in FIG. 5, video data to be displayed on an electronic viewfinder 113 of a camera apparatus 100' is supplied from a development unit 200'.

To be more specific, as shown in FIG. 5, video data having the HD standard obtained by a down-conversion section 210 in the development unit 200' is supplied to a raw data transmission processing section 201'. Then, this video data having the HD standard is transmitted to the camera apparatus 100' over an optical cable 16.

Next, a raw data transmission processing section 105' of the camera apparatus 100' supplies the received video data having the HD standard to the electronic viewfinder 113 for display.

The other portions are configured in substantially the same manner as the camera apparatus 100 and the development unit 200 shown in FIG. 1.

In the above-mentioned configuration, the video displayed on the electronic viewfinder 113 of the camera apparatus 100' is the video data obtained by down-converted by the development unit 200'. Therefore, unlike the example shown in FIG. 1, the lowpass filter 111 and the thin-out processing section 112 required for obtaining the video data to be displayed on the electronic viewfinder 113 need not be arranged, thereby simplifying the configuration of the camera apparatus 100.

Figure 6:
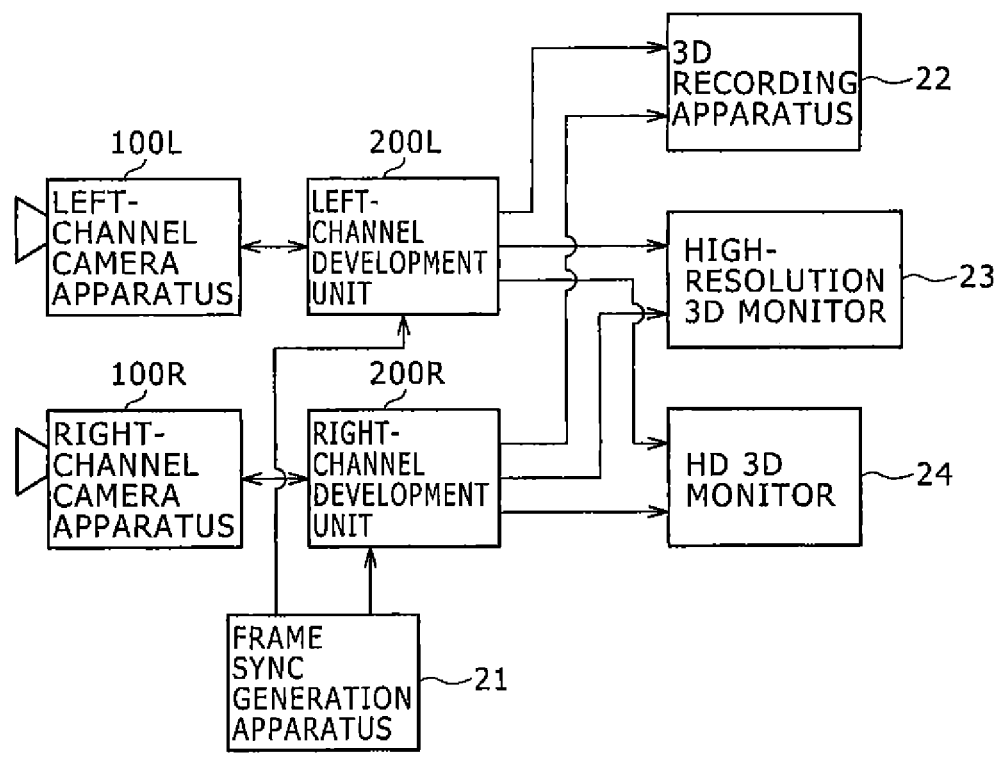
FIG. 6 is a block diagram illustrating an example in which the systems of the embodiments of the invention is a 3D imaging system.

(4) The Description of an Example in which the Embodiments are Applied to a 3D Imaging System The following describes an example of applying the imaging system according to the present embodiment to a 3D imaging system with reference to FIG. 6.

In this case, as shown in FIG. 6, two camera apparatuses are arranged; a left-channel camera apparatus 100L and a right-channel camera apparatus 100R. Likewise, two development units are arranged; left-channel development unit 200L and a right-channel development unit 200R.

The camera apparatuses 100L and 100R are each configured in the same manner as the camera apparatus 100 shown in FIG. 1 (or the camera apparatus 100' shown in FIG. 5). Likewise, the development units 200L and 200R are each configured in the same manner as the development unit 200 shown in FIG. 1 (or the development unit 200' shown in FIG. 5).

The left-channel camera apparatus 100L and the left-channel camera apparatus 100L are interconnected by an optical cable, over which left-channel raw data is supplied from the left-channel camera apparatus 100L to the left-channel development unit 200L. Likewise, the right-channel camera apparatus 100R and the right-channel development unit 200R are interconnected by an optical cable, over which right-channel raw data is supplied from the right-channel camera apparatus 100R to the right-channel development unit 200R.

On the left channel development unit 200L and the right-channel development unit 200R, synchronization processing is executed on the basis of the synchronous data supplied from a frame synchronization generation apparatus 21. The imaging by the left-channel camera apparatus 100L and the imaging by the right-channel camera apparatus 100R are also synchronized.

The video data obtained by the conversion in the left-channel development unit 200L and the video data obtained by the conversion in the right-channel development unit 200R are supplied to a 3D recording apparatus 22 to be recorded therein. Alternatively, the left-channel raw data and the right-channel raw data may be supplied to the 3D recording apparatus 22 to be recorded therein.

Further, the video data obtained by the conversion in the left-channel development unit 200L and the video data obtained by the conversion in the right-channel development unit 200R are supplied to a high-resolution 3D monitor 23 to be displayed in a three-dimensional manner. Likewise, the video data of the HD standard obtained by down-conversion in the left-channel 200L and the video data of the HD standard obtained by down-conversion in the right-channel development unit 200R are supplied to an HD-standard 3D monitor 24 to be displayed thereon.

The above-mentioned system shown in FIG. 6 provides effects of efficiently executing the imaging of high-resolution video for three-dimensional display in synchronization.

It should be noted that the monitors 23 and 24 may be normal monitors that are not for three-dimensional display. In this case, one of the channels is selectively displayed or the videos of the two channels are displayed side by side.

(5) The Description of Variations

It should be noted that the configurations described above in reference to the drawings are illustrative only and therefore not limited thereto.

For example, the Bayer array shown in FIG. 2A as the pixel array of the image sensor of the camera apparatus is only one example. Therefore, an image sensor having another array is also available.

The processing configuration in the development unit 200 may be short of one or more component sections. The frame synchronization generation apparatuses 11 and 21 are separate from the development unit 200. It is also practicable to unitize the frame synchronization generation apparatuses 11 and 21 with the development unit 200 to generate synchronous data inside therein.

The 3D imaging system shown in FIG. 6 was presented as an exemplary system configuration having two or more camera apparatuses. The present invention is also applicable to other multi-camera systems configured by two or more camera apparatuses.

The present application contains subject matter related to that disclosed in Japanese Priority Patent Application JP 2010-080360 filed in the Japan Patent Office on Mar. 31, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video system comprising:
   a camera apparatus including
      an image sensor that includes pixels arranged in an array and that is configured to output an image signal having a pixel sequence corresponding to the array of the pixels, and
      a first input/output section at the camera apparatus configured to output the image signal and communicate synchronous data used for synchronizing at least part of the camera apparatus;
   a video processing apparatus including
      a second input/output section at the video processing apparatus configured to communicate synchronous data with the camera apparatus; and
      a cable, coupled to the camera apparatus and to the video processing apparatus, configured to transmit the image signal and synchronous data used for synchronizing at least part of the camera apparatus and the video processing apparatus;

wherein the video processing apparatus further includes:
a transmission processor configured to
process the received image signal into a first video data having a pixel array specified by a first video format and at least substantially 4K horizontal resolution, and a second video data having a pixel array specified by a second video format and resolution less than the first video format, and
output the first video data and the second video data for displaying the image signal on a first display having at least substantially 4K horizontal resolution and on a second display having less resolution than the first display.

2. The video system according to claim 1, wherein the transmission processor includes a down converter configured to convert the image signal into a second image signal having a horizontal resolution less than 4K.

3. The video system according to claim 1, wherein the second video format is HD standard.

4. The video system according to claim 1, wherein the video processing apparatus further includes a synchronization processing section configured to receive synchronous data from other apparatus.

5. The video system according to claim 4, wherein the other apparatus is an external frame synchronization generation apparatus.

6. The video system according to claim 1, wherein the down converter is operable in synchronization with the synchronous data.

7. The video system according to claim 1, wherein the first video data and second video data are outputted in synchronization with each other, based on the synchronous data.

8. The video system according to claim 1, wherein the image sensor includes pixels in a predetermined array, and the image signal that is output by the image sensor has a pixel sequence corresponding to the array of the pixels.

9. The video system according to claim 8, wherein the image signal has at least 3840 horizontal pixels per frame.

10. The video system according to claim 8, wherein the first video data has substantially 8K horizontal resolution.

11. The video system according to claim 8, wherein the transmission processor is configured to perform pixel interpolation of the received image signal to obtain the first video data.

12. The video system according to claim 11, wherein received image signal has a number of pixels and the first video data has a number of pixels greater than the number of pixels of the received image signal.

13. The video system according to claim 8, wherein the image signal output by the first input/output section exhibits a transmission format different from the first video format.

14. The video system according to claim 8, wherein the camera apparatus further includes a synchronization processing section configured to control timing of imaging by the image sensor based on synchronous timing setting data provided in response to the synchronous data communicated from the video processing apparatus.

15. The video system according to claim 1, wherein the first input/output section is configured to receive synchronous data from the second input/output section.

16. The video system according to claim 1, wherein the first input/output section is configured to receive synchronous data from the second input/output section via the cable, and the image sensor is operable in synchronization with the synchronous data.

17. The video system according to claim 1, wherein the second input/output section is configured to receive synchronous data from the first input/output section via the cable, and the transmission processor is operable in synchronization with the synchronous data.

18. A method for a video camera system comprising a camera apparatus having an image sensor including pixels arranged in an array, a video processing apparatus remote from the camera apparatus and operable in synchronization with at least a portion of the camera apparatus, and a cable coupled between the camera apparatus and the video processing apparatus, the method comprising:
producing, at the image sensor, an image signal having a pixel sequence corresponding to the array of the pixels;
outputting at the camera apparatus the image signal and communicating synchronous data used for synchronizing at least part of the camera apparatus with the video processing apparatus;
sending over the cable the image signal;
operating the video processing apparatus in synchronization with at least part of the camera apparatus;
processing the received image signal into a first video data having a pixel array specified by a first video format and at least substantially 4K horizontal resolution, and a second video data having a pixel array specified by a second video format and resolution less than the first video format; and
outputting the first video data and the second video data for displaying, respectively, on a first display having at least substantially 4K horizontal resolution and on a second display having less resolution than the first display.

19. The method according to claim 18, further comprising performing pixel interpolation of the received image signal at the video processing apparatus to obtain the first video data.

20. The method according to claim 18, wherein the image signal output at the camera apparatus exhibits a transmission format different from the first video format.

21. A video processing apparatus comprising:
an input/output section configured to communicate synchronous data with a camera apparatus via a cable, the camera apparatus including an image sensor having pixels arranged in an array and being synchronized based on the synchronous data and input an image signal from the camera apparatus via the cable, and
processor apparatus configured to
process the input image signal into a first video data having a pixel array specified by a first video format and at least substantially 4K horizontal resolution, and a second video data having a pixel array specified by a second video format and resolution less than the first video format, and
output the first video data and the second video data for displaying, respectively, on a first display having at least substantially 4K horizontal resolution and on a second display having less resolution than the first display.

22. The video processing apparatus of claim 21, wherein the processor apparatus includes a down converter configured to convert the image signal into a second image signal having a
horizontal resolution less than 4K.

23. The video processing apparatus of claim 22, wherein the down converter is operable in synchronization with the synchronous data.

24. The video processing apparatus of claim 21, wherein the second video format is HD standard.

25. The video processing apparatus of claim 21, wherein the first video data and second video data are outputted in synchronization with each other, based on the synchronous data.

26. The video processing apparatus of claim 21, wherein the input/output section is configured to transmit the synchronous data to the camera apparatus.

27. A method for processing an image signal received from camera apparatus via a cable, the method comprising:
processing the received image signal in synchronization with at least part of the camera apparatus to produce first video data having a pixel array specified by a first video format and at least substantially 4K horizontal resolution, and second video data having a pixel array specified by a second video format and resolution less than the first video format; and
outputting the first video data and the second video data for displaying, respectively, on a first display having at least substantially 4K horizontal resolution and on a second display having less resolution than the first display.

28. The method according to claim 27, further comprising performing pixel interpolation of the received image signal to obtain the first video data.

29. A video system comprising:
a camera apparatus including
    an image sensor that includes pixels arranged in an array and that is configured to output an image signal having a pixel sequence corresponding to the array of the pixels, and
    a first input/output section at the camera apparatus configured to output the image signal and input control data used for synchronizing at least part of the camera apparatus;
a video processing apparatus including
    a second input/output section at the video processing apparatus configured to output the control data to the camera apparatus; and
    a cable, coupled to the camera apparatus and to the video processing apparatus, configured to transmit the image signal and the control data used for synchronizing at least part of the camera apparatus and the video processing apparatus;
wherein the video processing apparatus further includes:
    a transmission processor configured to
        process the received image signal into a first video data having a pixel array specified by a first video format and at least substantially 4K horizontal resolution, and a second video data having a pixel array specified by a second video format and resolution less than the first video format, and
        output the first video data and the second video data for displaying the image signal on a first display having at least substantially 4K horizontal resolution and on a second display having less resolution than the first display.

* * * * *